United States Patent [19]

Kashiwagi

[11] Patent Number: 5,437,586
[45] Date of Patent: Aug. 1, 1995

[54] RESTRICTIVE CONTROL SYSTEM FOR DIFFERENTIAL

[75] Inventor: Keiji Kashiwagi, Higashihiroshima, Japan

[73] Assignee: Mazda Motor Corporation, Hiroshima, Japan

[21] Appl. No.: 202,110

[22] Filed: Feb. 25, 1994

[30] Foreign Application Priority Data

Feb. 26, 1993 [JP] Japan .................. 5-063152

[51] Int. Cl.⁶ .................................. B60K 41/28
[52] U.S. Cl. ........................................ 477/35
[58] Field of Search ..................... 477/35; 180/197

[56] References Cited

U.S. PATENT DOCUMENTS

| | | | |
|---|---|---|---|
| 4,711,317 | 12/1987 | Sakakiyama | 180/197 |
| 4,825,368 | 4/1989 | Itoh et al. | 364/424.1 |
| 4,872,372 | 10/1989 | Bantle et al. | 477/35 |
| 4,953,654 | 9/1990 | Imaseki et al. | 180/197 |
| 5,075,854 | 12/1991 | Imaseki et al. | 364/424.05 |
| 5,270,930 | 12/1993 | Ito et al. | 364/424.1 |
| 5,289,895 | 3/1994 | Takata et al. | 180/248 |
| 5,301,769 | 4/1994 | Weiss | 180/249 |

FOREIGN PATENT DOCUMENTS 59-11922  1/1984  Japan .

*Primary Examiner*—Dirk Wright
*Attorney, Agent, or Firm*—Keck, Mahin & Cate

[57] ABSTRACT

A restrictive control system for a differential which drives both drive axles at the same time but allows them to turn at different speeds during turning. The system variably generates a restrictive force, with which the differential is restricted in differential action, during turns. The restrictive force is reduced when a change in engine load is detected which is greater than a predetermined value and a steering angle is detected which is greater than a predetermined angle.

12 Claims, 6 Drawing Sheets

RESTRICTIVE CONTROL SYSTEM FOR DIFFERENTIAL

BACKGROUND OF THE INVENTION

1. Field of the Invention

The present invention relates to a differential for an automobile, and, more particularly, to an automobile differential whose locking force is variably controlled according to driving conditions.

2. Description of Related Art

Typically, automobiles are provided with differentials which drive both drive axles at same time, but allow them to turn at different speeds when negotiating turns. When one of the drive wheels gets caught in an irregular part of a road having a considerably low friction coefficient, such as mud in the road, such an automobile differential delivers the engine torque mostly to the one drive wheel, and consequently, causes slippage of the one drive wheel with respect to the road. Such slippage precludes the automobile from the ability to get out of the mud. In order to prevent the automobile from being so precluded in such a situation, a number of differentials of this sort are equipped with a differential lockup feature. When the rate of slippage of either one of the drive wheels or the speed difference between the drive wheels exceeds a predetermined critical lockup level, the differential is locked so as to be prevented from producing differential action.

It has been known to vary the critical lockup level of slippage rate. Establishing a higher critical lockup level of slippage rate allows the differential to produce sufficient differential action to improve the ability of turning or cornering on a normal road. On the other hand, when a lower critical lockup level of slippage rate is established, the differential allows only a slight differential action, while providing a reliable driving performance during traveling on a slippery road, such as a road with snow. Such a lockup type of differential is known from, for instance, Japanese Unexamined Patent Publication No. 59-11922.

In recent years, for the purpose of improving driving performance during turning or cornering, differentials are equipped with a variable differential action control feature so that differential action is variable in accordance with input torque to the differential. With this type of differential, as the input torque to the differential increases, a restrictive force against differential action is intensified more strongly. This provides an increase in limit speed during turning, so as to improve the responsiveness of acceleration even during turning or cornering.

When a quick acceleration is made while the vehicle is turning with the differential restricted in differential action, what is called "pushing under" is, in some cases, experienced depending upon steering angles. This behavior of pushing under is caused because the differential, when experiencing an increase in input torque resulting from quick acceleration, delivers the input torque mainly to the inner drive wheel which is lower in speed than the outer drive wheel, and consequently, provides a cornering force to the inner drive wheel stronger than to the outer drive wheel. The vehicle, when negotiating a corner, experiences a tendency to under-steer and turns less sharply than the driver intends. On the other hand, when engine braking is applied, resulting from a quick deceleration while the vehicle is turning with the differential restricted in differential action, the vehicle experiences so-called "over engine braking" which is caused because a reverse torque, which acts on the vehicle to brake it, is provided by engine braking mainly to the inner drive wheel which is lower in speed than the outer drive wheel, and consequently, provides a braking force stronger to the inner drive wheel than to the outer drive wheel. This over engine braking causes a tendency to oversteer, and the vehicle turns more sharply than the driver intends when the vehicle is negotiating a corner.

These tendencies are experienced more remarkably by, in particular, front-engine rear-drive vehicles even experienced to a certain extent by other types of vehicles. In any type of vehicle, the tendency of under pushing and over engine braking causes deterioration of the driving performance of vehicle during turning.

SUMMARY OF THE INVENTION

It is therefore an object of the present invention to provide a restrictive control system for a differential which prevents a strong tendency to under-steer or to over-steer due to quick acceleration or deceleration during turns, while the differential is restricted in differential action, thereby providing improvement of driving performance during turning.

The above object of the present invention is accomplished by providing a restrictive control system for a differential which drives both drive axles, for instance rear drive axles, at same time but allows them to turn at different speeds when negotiating turns, and variably generates a restrictive force, with which the differential is restricted in differential action, in accordance with an input torque thereto from a power unit, including a front engine, during a turn. The restrictive control system has a control means for controlling the differential to reduce the restrictive force regardless of the input torque during detections of changing rates of engine load greater than a predetermined changing rate, and a detection of steering angle greater than a predetermined steering angle.

Specifically, during a sharp turn under acceleration or deceleration, the control means cancels the restrictive force when detecting changing rates of throttle opening as the engine load is greater than a predetermined positive rate or smaller than a predetermined negative rate during the detection of steering angles greater than the predetermined steering angle. On the other hand, during a sharp turn under normal cruising, the control means cancels the restrictive force when throttle openings are smaller than a predetermined positive level of throttle opening during the detection of steering angles greater than a predetermined level of steering angle.

With the restrictive control system for a differential according to the invention, when an increase in engine load takes place at a changing rate larger than a predetermined level due to a rapid acceleration, while the differential is restricted in differential action during a sharp turn in which the operated steering angle is larger than the specific steering angle, the restrictive control system reduces the restrictive action of the differential or frees the differential from restriction, to enable it to allow the drive wheels to turn at different speeds with a suppressed restrictive force or without any restriction when negotiating turns. As a result, the occurrence of a strong tendency to under-steer, which is accompanied by the behavior of pushing under, due to a quick increase in input torque is avoided.

Similarly, when engine brake is quickly applied due to a rapid deceleration, while the differential is restricted in differential action during a sharp turn in which the operated steering angle is larger than a specific steering angle, the restrictive control system reduces the restrictive action of the differential or frees the differential from restriction. In such a case, the occurrence of a strong tendency to over-steer due to a quick application of engine braking, which is accompanied by the behavior of over engine braking to the vehicle, is avoided.

Furthermore, generating a restrictive force in accordance with input torque to the differential provides the improvement of responsiveness to acceleration during sharp turns and prevents the occurrence of pushing under or the application of over engine braking which is remarkable on front-engine rear-drive vehicles.

BRIEF DESCRIPTION OF THE DRAWINGS

The above and other objects and features of the present invention will be clearly understood from the following description directed to preferred embodiments thereof, when considered in conjunction with the accompanying drawings, in which.

DETAILED DESCRIPTION OF THE PREFERRED EMBODIMENTS

Figure 1:
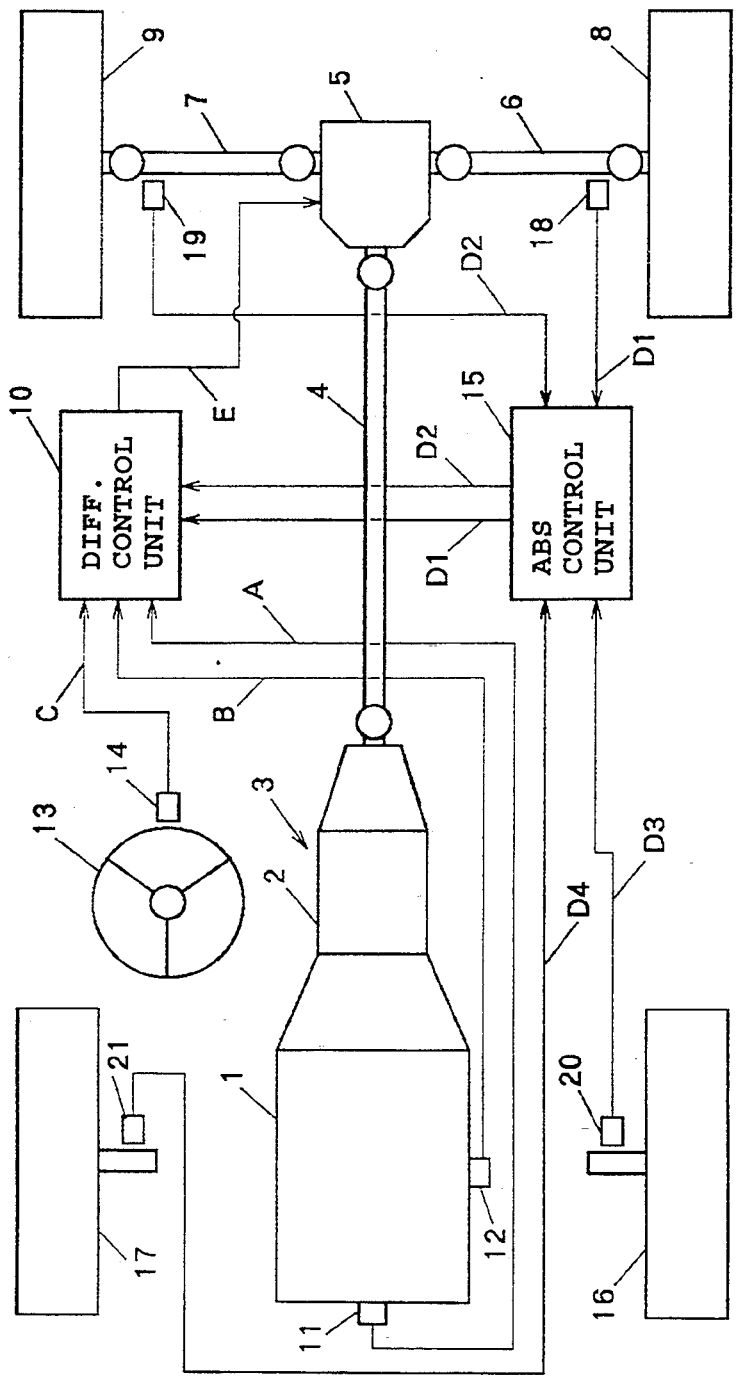
FIG. 1 is a schematic view of a front-engine rear-drive vehicle having a differential equipped with the restrictive control system in accordance with a preferred embodiment of the present invention.

Referring to the drawings in detail, and in particular, to FIG. 1 schematically showing an automotive vehicle, such as a front-engine rear-drive vehicle, provided with a differential equipped with a differential action restrictive control feature in accordance with a preferred embodiment of the present invention, a power unit 3, including at least an engine 1 and a transmission 2, is installed in the front section of the vehicle body(not shown). Output torque is transmitted from the power unit 3 to a rear axle differential unit 5, disposed in the rear section of the vehicle body through a propeller shaft 4. At unit 5 the torque is divided into two parts and transmitted to left and right rear drive wheels 8 and 9 through left and right drive axles 6 and 7, respectively. This rear axle differential 5 equipped with a differential action restrictive control feature, which will be described in detail later, is controlled by means of a differential control unit 10 consisted mainly by a general purpose microcomputer. The vehicle is further equipped with an anti-skid brake system, well known as an ABS, which is controlled by means of an ABS control unit 15 consisted mainly by a general purpose microcomputer.

The differential control unit 10 receives various signals representative of differential control parameters, such as, an engine speed signal A, a throttle opening signal B, and a steering angle signal C. The engine speed signal A, which indicates the speed of rotation of the crankshaft (not shown) of the engine 1, is provided by a speed sensor 11. The throttle opening signal B, which indicates the degree of opening of the throttle valve (not shown) disposed in an intake line of the engine 1, is provided by an opening sensor 12. The steering angle signal C, which indicates the angle of steerage of the steering wheel 13, is provided by an angle sensor 14. Wheel speed signals D1–D4, which indicate the speeds of rotation of rear drive wheels 8 and 9 and front driven wheels 16 and 17, respectively, are provided by speed sensors 18–21, respectively, and are sent to the ABS control unit 15. The rear drive wheel speed signals D1 and D2 are further transmitted to the differential control unit 10 from the ABS control unit 15. All these sensors 11, 12, 14 and 18 through 21 are well known in the automobile art and may take the form of any type well known to those skilled in the art.

Based on the signals A, B, C, D1 and D2, the differential control unit 10 determines the degree of restriction to differential action of the differential 5 and provides a control signal E so as to generate a restrictive force in the differential 5.

Figure 2:
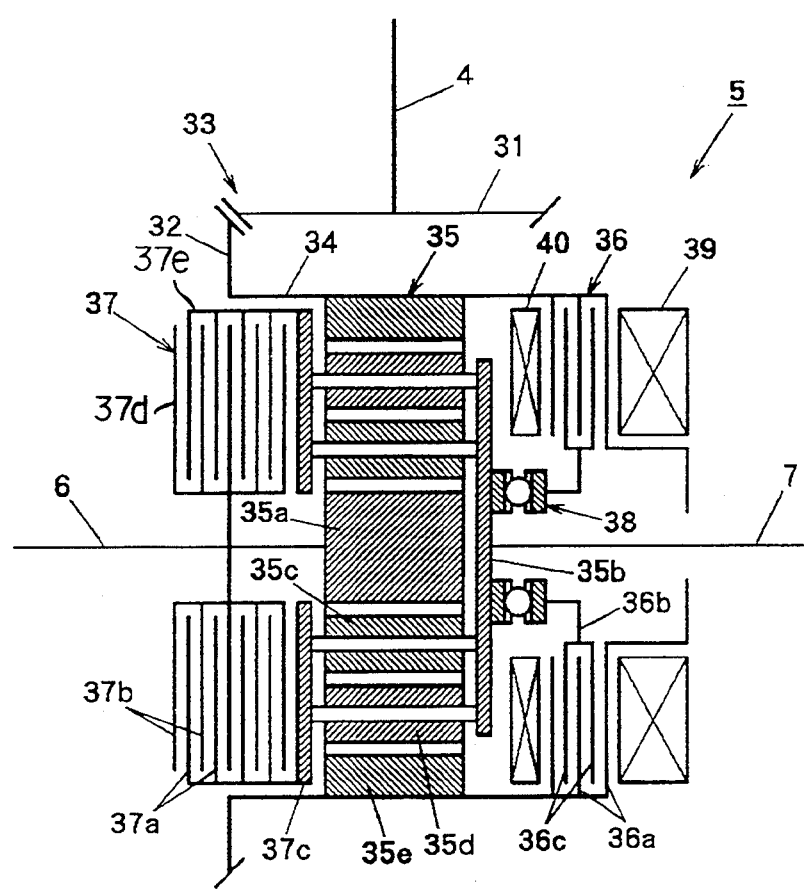
FIG. 2 is a schematic view of a configuration of the differential.

Referring to FIG. 2 showing the detailed mechanical structure of the rear axle differential 5, the rear axle differential 5 includes a reduction gear set 33 consisting of a pinion gear 31 turned by the propeller shaft 4 and a ring gear 32 disposed coaxially with the axis of rotation of the drive axles 6 and 7 and being in mesh with the pinion gear 31. The ring gear 32 is mounted on and secured to a differential case 34. Inside the differential case 34, the rear axle differential 5 has a double pinion type of planetary gear set 35, and pilot and main ring clutches 36 and 37 disposed on opposite sides of the planetary gear set 35, respectively. The rear axle differential 5 further has a ring cam mechanism 38 disposed on the same side of the planetary gear set 35 as the pilot ring clutch 36 is disposed in the differential case 34. The pinion carrier 35b is held for a limited range of axial movement. In this instance, the propeller shaft 4 turns the pinion gear 31. The pinion gear 31 turns the ring gear 32 which, in turn, revolves the differential case 34. When the differential case 34 turns, the planetary gear set 35 turns with it.

Planetary gear set 35 has a sun gear 35a disposed coaxially with the axis of rotation of the drive axles 6 and 7, a first pinion gear 35c carried for rotation by a pinion carrier 35b and engaged by the sun gear 35a, a second pinion gear 35d carried for rotation by a pinion carrier 35b and engaged by the first pinion gear 35c, and a ring gear 35e secured to the differential case 34 and engaged by the second pinion gear 35d. The sun gear 25a is secured to one of the drive axles, for instance the left drive axle 6, and the pinion carrier 35b is secured to the other, namely the right drive axle 7. When the left and right rear drive wheels 8 and 9 are subjected to an equal load, the rear axle differential 5 delivers torque equally to the drive axles 6 and 7, turning the rear drive wheels at a same speed. On the other hand, when the vehicle is turning, the outer drive wheel, for instance the right rear drive wheel 9 is subjected to a load smaller than the inner drive wheel, i.e. the left rear drive wheel 8, so that the rear axle differential 5 turns the right rear drive wheel 9, which is the outer drive wheel, at a speed higher than the left rear drive wheels 8.

Pilot clutch 36, which is of multiple disc type having an alternate arrangement of drive and driven clutch discs, is structured by drive discs 36a secured to the differential case 34 and driven discs 36c secured to a clutch hub 36b which is supported by the right drive axle 7 so as to be rotative around the right drive axle 7 but not movable in any axial direction. On opposite sides of the pilot clutch 36, a ring-shaped solenoid 39 and a ring-shaped armature 40 are disposed. When the ring solenoid 39 is electrically charged, it attracts the ring armature 40 with an attracting force, which is proportional to the amount of charged current, so as to couple the drive and driven discs 36a and 36c together with a coupling force depending upon the attracting force.

Main clutch 37, which is of multiple disc type having an alternate arrangement of drive and driven clutch discs, is structured by drive discs 37a secured to the pinion carrier 35b of the planetary gear set 35, driven discs 36b stationarily supported by a clutch hub 37d which is secured to the left drive axle 6, and a clutch drum 37e which is mechanically integrated with the pinion carrier 35b through a pressure disc 37c. This pressure disc 37c squeezes the clutch discs 37a and 37b together when the pinion carrier 35b is axially moved away from the pilot clutch 36. On the same side of the planetary gear set 35 as the pilot ring clutch 36 and between the clutch hub 36b of the pilot clutch 36 and the pinion carrier 35b of the planetary gear set 35, there is placed the ring cam mechanism 38.

Figure 3:
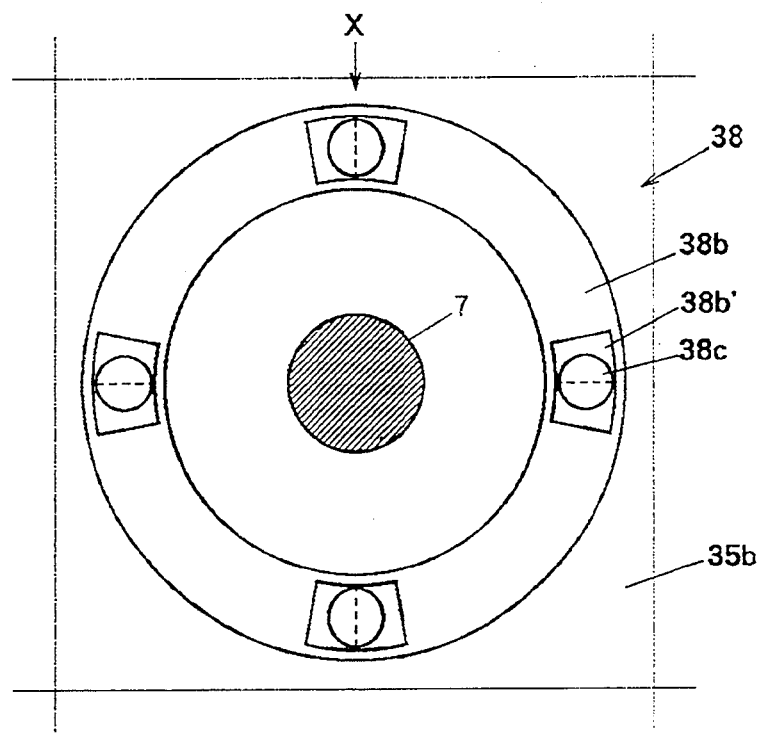
FIG. 3 is an enlarged cross-sectional view of a cam mechanism of the differential.
Figure 4:
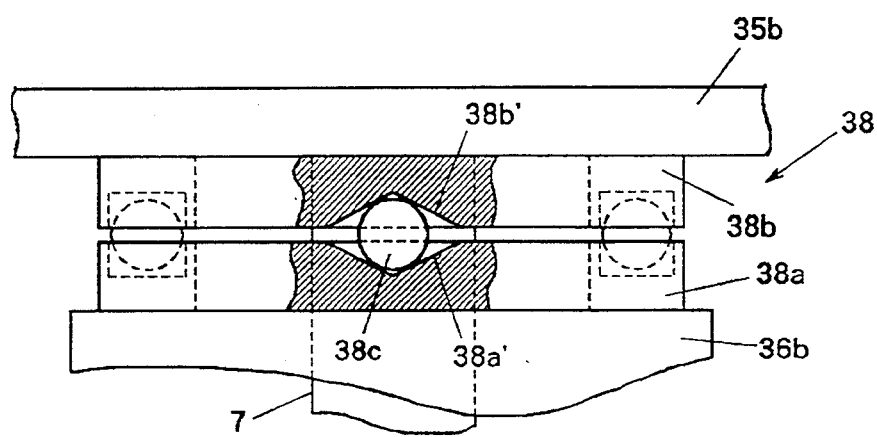
FIG. 4 is a plan view of the cam mechanism as viewed from the direction shown by an arrow X in FIG. 3.

Now, referring to FIGS. 3 and 4, the ring cam mechanism 38 is structured by a pair of cam rings 38a and 38b, and a plurality of balls 38c. The cam ring 38a is formed with the same number of oppositely tapered grooves 38a' as the balls 38c located at regular angular separations on its one surface opposite to the another cam ring 38b. Similarly, the cam ring 38b is formed with the same number of oppositely tapered grooves 38b' as the balls 38c located at regular angular separations on its one surface opposite to the one surface of the cam ring 38a. The balls 38c are held between the respective opposite grooves 38a' and 38b' of the cam rings 38a and 38b, respectively.

Referring back to FIG. 2, while the pilot clutch 36 is left released, the transmission of rotation of the pinion carrier 35b is connected to the driven discs of the pilot clutch 36 by means of the engagement of cam rings 38a and 38b through the balls 38c. Further, when the pilot clutch 36 is applied, the clutch discs 37a and 37b are pressed together by the pressure disc 37c to lock the clutch hub 36b and the differential case 34 together. With the pilot clutch 36 applied, the clutch hub 36b and the differential case 34 rotate as one whole. If the differential case 34 and the pinion carrier 35b rotate at a same speed, both cam rings 38a and 38b rotate at the same speed as the pinion carrier 35b holding the balls 38c between their opposite grooves 38a' and 38b', respectively.

On the other hand, when the planetary gear set 35 allows differential action so as to cause relative rotation between the pinion carrier 35b and the ring gear 35e, and hence the differential case 34, while the pilot clutch 36 is applied, there occurs relative rotation between the cam rings 38a and 38b. As a result, the cam rings 38a and 38b causes displacement between each opposite grooves 38a' and 38b' and push the ball 38c out of these grooves 38a' and 38b' so as to force the pinion carrier 35b axially away from the clutch hub 36b of the pilot clutch 36. As a result of this axial movement of the pinion carrier 35b, the clutch disks 37a and 37b of the main clutch 37 are pressed together to lock the clutch hub 37d and the clutch drum 37e which is mechanically integrated with the pinion carrier 35b through the pressure disc 37c. In this instance, the locking force with which the main clutch 37 is locked is proportional to the axial movement of the pinion carrier 35b caused by the application of the pilot clutch 36. Since, as was described previously, the locking force for the pilot clutch 36 is corresponding to the attracting force of the ring solenoid 39 which is proportional to the amount of charged current applied to the ring solenoid 39, the locking force for the main clutch 37, which governs restrictive force of the differential action between the sun gear 35a and the pinion carrier 35b of the planetary gear set 35, and hence, between the left and right rear driving wheels 8 and 9, can be managed by controlling of the amount of charged current to the ring solenoid 39.

Figure 5:
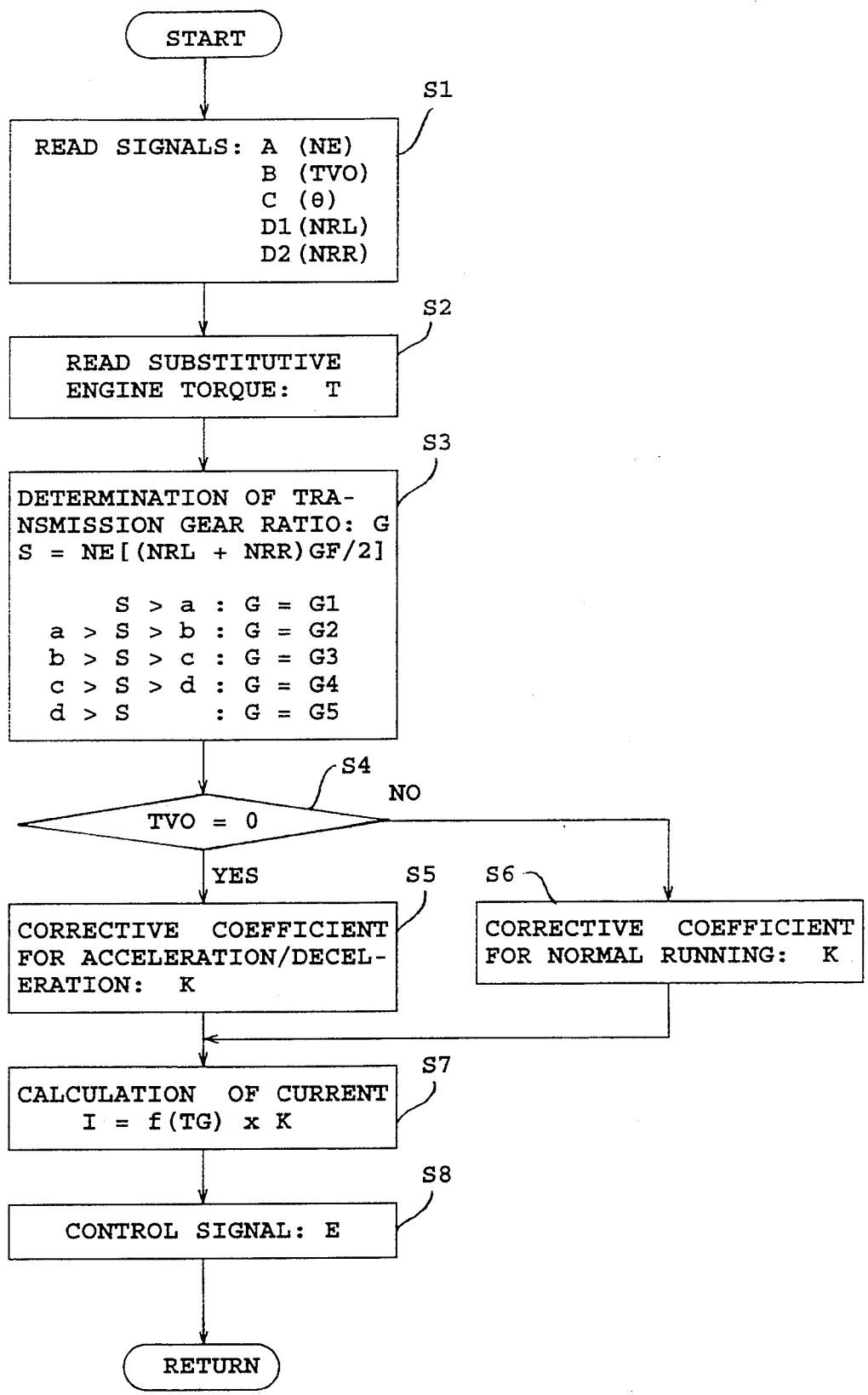
FIG. 5 is a flow chart illustrating a restrictive control of the differential.
Figure 6:
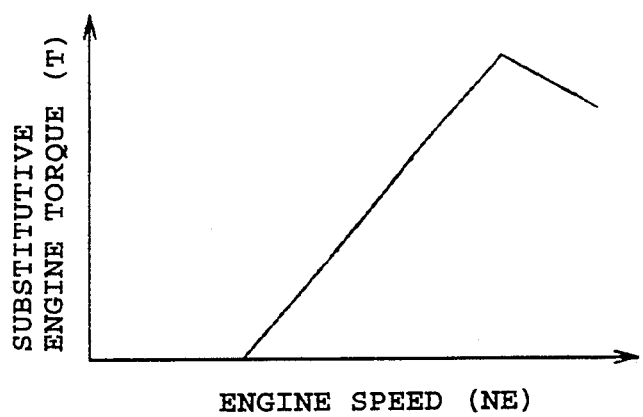
FIG. 6 is a diagram showing the relationship of substitutive engine torque relative to engine speed.

FIG. 5 is a flow chart illustrating the applying current control routine for the microcomputer of the differential control unit 10. The control routine commences and control passes directly to step S1 where control parameter signals A, B, C, D1 and D2, which indicate, respectively, an engine speed (NE), a throttle opening (TVO), a steering angle (Θ), a left rear drive wheel speed (NRL) and a right rear drive wheel speed (NRR), are read in. Then, at step S2, an engine torque (T) is read on a substitutive torque map as shown in FIG. 6, for an actual engine torque of the engine 1, in accordance with an engine speed (NE). Subsequently, a desired gear (G) is determined on the basis of an estimated gear ratio (S) of the transmission 2 at step S3. The estimation of gear ratio is made from the following formula (I):

$$S = NE/[(NRL+NRR)GF/2] \qquad (I)$$

where GF is the gear ratio of the reduction gear set 33.

This estimated gear ratio (S) of the transmission 2 is compared with first to fourth threshold gear ratios a, b, c and d. These threshold gear ratios are established as intermediate gear ratios between respective adjacent gears. Specifically, the first threshold gear ratio a takes an intermediate gear ratio between gear ratios G1 and G2 of the adjacent gears, i.e. a first gear and a second gear, respectively; the second threshold gear ratio b takes an intermediate gear ratio between the gear ratio G2 and a gear ratio G3 of adjacent gears, i.e. the second gear and a third gear, respectively; the third threshold gear ratio c takes an intermediate gear ratio between the gear ratio G3 and a gear ratio G4 of the adjacent gears, i.e. the third gear and a fourth gear, respectively; and the fourth threshold gear ratio d takes an intermediate gear ratio between the gear ratio G4 and a gear ratio G5 of the adjacent gears, i.e. the fourth gear and a fifth gear, respectively. If the estimated gear ratio (S) is larger than the first threshold gear ratio a, then the first gear ratio G1 is determined as the transmission gear ratio G. If the estimated gear ratio (S) is smaller than the first threshold gear ratio a and larger than the second threshold gear ratio b, then the second gear ratio G2 is determined as the transmission gear ratio G. If the estimated gear ratio (S) is smaller than the second threshold gear ratio b and larger than the third threshold gear ratio c, then the third gear ratio G3 is determined as the transmission gear ratio G. If the estimated gear ratio (S) is smaller than the third threshold gear ratio c and larger than the fourth threshold gear ratio d, then the fourth gear ratio G4 is determined as the transmission gear ratio G. If the estimated gear ratio (S) is smaller than the fourth threshold gear ratio d, then the fifth gear ratio G5 is determined as the transmission gear ratio G.

Figure 7:
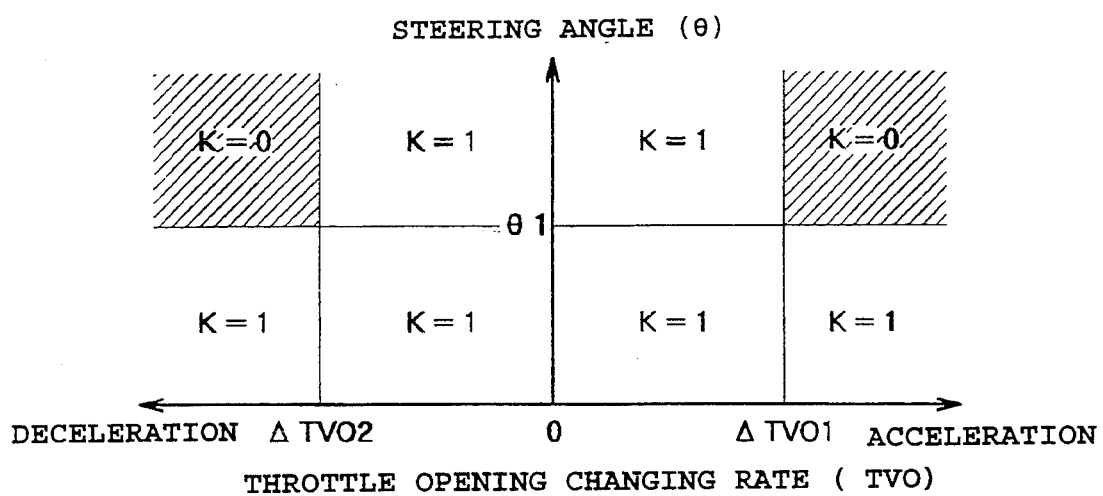
FIG. 7 is a diagram showing a corrective coefficient map for accelerative/decelerative condition.
Figure 8:
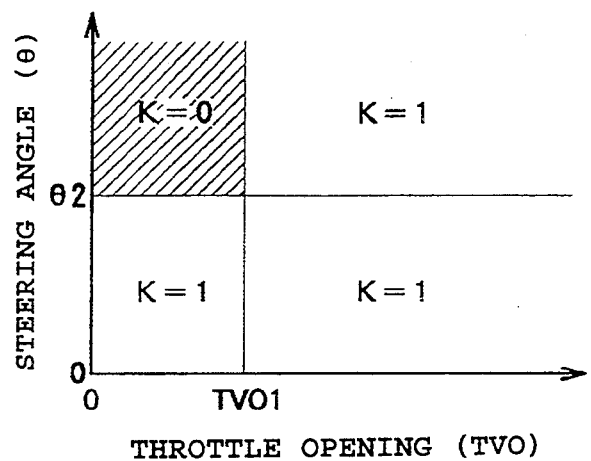
FIG. 8 a diagram showing a corrective coefficient map for cruising condition.

After the determination of transmission gear ratio G, a decision is made at step S5 as to whether the changing rate of throttle opening (TVO) is not zero (0). If the answer to the decision is "YES," this indicates that the engine 1 is under acceleration or deceleration, then, at step S5, a control corrective coefficient (K) is read on a corrective coefficient map for accelerative/decelerative condition shown in FIG. 7. On the other hand, if the answer to the decision is "NO," this indicates that the engine 1 is under cruising condition, then, at step S6, a control corrective coefficient (K) is read on a corrective coefficient map for cruising condition shown in FIG. 8. The acceleration/deceleration corrective coefficient map assigns zero (0) to the corrective coefficient K when the steering angle Θ is larger than a specific steering angle Θ1 and the changing rate of throttle opening (TVO) is larger than a specific positive level of changing rate (TVO1) or smaller than a specific negative level of changing rate (TVO2), and one (1) for steering angles Θ and changing rates of throttle opening (TVO) other than the above. The cruising corrective coefficient map assigns zero (0) to the corrective coefficient K when the steering angle Θ is larger than a specific steering angle Θ2 and a throttle opening (TVO) is smaller than a specific positive level of throttle opening (TVO1), and one (1) for steering angles Θ and throttle openings (TVO) other than the above.

Subsequent to the assignment of corrective coefficient K at step S5 or at step S6, a calculation is performed at step S7 to determine a current (I) to be supplied to the ring-shaped solenoid 39 which is expressed by the following formula (II):

$$I = Io \times K = f(TG) \times K \quad \text{(II)}$$

Figure 9:
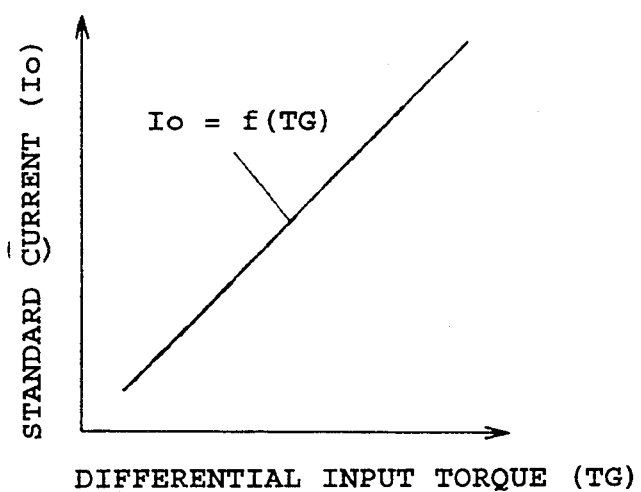
FIG. 9 is a diagram showing the relationship of standard current relative to differential input torque.

In this instance, the standard current Io is represented by a linear function of differential input torque (TG) as shown in FIG. 9. Finally, a control signal E is provided at step S8 so as to apply the current (I) to the ring-shaped solenoid 39, thereby controlling a restrictive force of the pilot clutch 36, and hence the main clutch 37.

As described above, in the determination of the current I to be applied to the ring-shaped solenoid 39 according to driving conditions, when the changing rate of throttle opening (TVO) is not zero (0) but larger than the specific positive level of changing rate (TVO1) and smaller than the specific negative level of changing rate (TVO2), in other words, during a relatively slow acceleration or a relatively slow deceleration, or when the operated steering angle (Θ) is smaller than the specific steering angle Θ1 even during a rapid acceleration or a rapid deceleration, the corrective coefficient K is set at one (1). Accordingly, the current (I), which is equal to the standard current (Io), corresponds to the differential input torque (TG), so that, with an increase in differential input torque, the restrictive force to the differential 5 increases, providing an increase in limit speed during turning. This limit speed increase results in an improved responsiveness to acceleration during turning. On the other hand, when a rapid acceleration in which the changing rate of throttle opening (TVO) is larger than the specific positive level of changing rate (TVO1) takes place during a sharp turn in which the operated steering angle (Θ) is larger than the specific steering angle Θ1, the corrective coefficient K is set at zero (0). In this state, the current (I) is zero (0), making the differential 5 free from restrictive force so as to enable it to allow the drive wheels to turn at different speeds without any restriction when negotiating turns. As a result, the occurrence of strong tendency of under-steer, which is accompanied by the behavior of pushing under, due to a quick increase in input torque while the differential 5 is restricted in differential action is avoided. Further, when a rapid deceleration in which the changing rate of throttle opening (TVO) is smaller than the specific negative level of changing rate (TVO2) takes place during a sharp turn in which the operated steering angle (Θ) is larger than the specific steering angle Θ1, the corrective coefficient K is set at zero (0) as well as a rapid acceleration. In this state, the current (I) is zero (0), making the differential 5 free from restrictive force so as to enable it to allow the drive wheels to turn at different speeds without any restriction when negotiating turns. As a result, the occurrence of a strong tendency to over-steer, which is accompanied by the application of over engine braking, due to a quick application of the engine brake while the differential 5 is restricted in differential action is avoided. Therefore, with the differential restrictive control system of this invention, changes in steering tendency and undesired behavior of a car body due to a quick change in throttle opening during relatively sharp turns are avoided, so that an improvement of driving performance is provided.

During normally cruising in which the changing rate of throttle opening (TVO) is zero (0), when the operated steering angle (Θ) is larger than the specific steering angle Θ2 and a throttle opening throttle opening (TVO) is smaller than the specific positive level of throttle opening (TVO1), in other words, when engine brake is applied during relatively sharp turn, the corrective coefficient K is set at zero (0) so that the current (I) is zero (0), making the differential 5 free from restrictive force so as to enable it to allow the drive wheels to turn at different speeds without any restriction when negotiating turns. Accordingly, with the differential restrictive control system of this invention, under the application of engine braking during a relatively sharp turn, the occurrence of a strong tendency to oversteer due to the restrictive differential action of the differential 5 is avoided, keeping the tendency of steering neutral, so as to provide an improvement of driving performance during turning.

In place of the wheel speed sensors 18 and 19 which are used to detect wheel speeds of the rear drive wheels 8 and 9, respectively, for controlling of the anti-skid brake system, extra wheel speed sensors may be installed for the differential restrictive control system of this invention.

It is to be understood that although the present invention has been described with respect to a preferred embodiment thereof, various other embodiments and variants may occur to those skilled in the art, which fall within the scope and spirit of the invention. Such other embodiments and variants are intended to be covered by the following claims.

What is claimed is:

1. A restrictive control system for a differential which drives both drive axles at same time but allows them to turn at different speeds when negotiating turns, said restrictive control system comprising:
    restrictive force generating means for variably generating a restrictive force, with which said differential is restricted in differential action, during a turn;
    steering angle sensing means for detecting a steered angle;
    load sensing means for detecting an engine load; and
    control means for controlling said restrictive force generating means to reduce said restrictive force during detection by said load sensing means of a change in said engine load greater than a predetermined change and detection by said steering angle sensing means of a steering angle greater than a predetermined steering angle.

2. A restrictive control system as defined in claim 1, wherein said differential drives rear drive axles with a torque received from a power unit including an engine disposed in a front section of a vehicle.

3. A restrictive control system as defined in claim 1, wherein said load sensing means detects a parameter relating to operation of an engine throttle valve as said engine load.

4. A restrictive control system as defined in claim 3, wherein said parameter is throttle opening of said engine throttle valve.

5. A restrictive control system as defined in claim 4, wherein said control means acts responsive to said throttle opening and controls said restrictive force generating means to cancel said restrictive force when the change of said throttle opening detected by said load sensing means is greater than a predetermined positive value of said change or smaller than a predetermined negative value of said change during detection of said steering angle greater than said predetermined steering angle.

6. A restrictive control system as defined in claim 4, wherein said control means controls said restrictive force generating means to cancel said restrictive force when said load sensing means detects a throttle opening of said engine throttle valve smaller than a predetermined positive value of throttle opening during a detection of said steering angle greater than a predetermined value of steering angle by said steering angle sensing means.

7. A restrictive control system for a differential which drives both drive axles at same time but allows them to turn at different speeds when negotiating turns, said restrictive control system comprising:
    restrictive force generating means for variably generating a restrictive force in accordance with an input torque thereto from a power train, with which said differential is restricted in differential action, during a turn;
    steering angle sensing means for detecting a steered angle;
    load sensing means for detecting a change of engine load; and
    control means for controlling said restrictive force generating means to reduce said restrictive force regardless of said input torque during a detection of said change of engine load greater than a predetermined level of engine load by said load sensing means and a detection of said steering angle greater than a predetermined value of steering angle by said steering angle sensing means.

8. A restrictive control system as defined in claim 7, wherein said differential drives rear drive axles with a torque from a power unit including an engine disposed in a front section of a vehicle.

9. A restrictive control system as defined in claim 7, wherein said load sensing means detects a parameter relating to operation of an engine throttle valve.

10. A restrictive control system as defined in claim 9, wherein said parameter is throttle opening of said engine throttle valve.

11. A restrictive control system as defined in claim 10, wherein said control means detects a change of said throttle opening and controls said restrictive force generating means to cancel said restrictive force when detecting a change of said throttle opening detected by said load sensing means greater than a predetermined positive value of said change or smaller than a predetermined negative value of said change during a detection of said steering angle greater than said predetermined steering angle.

12. A restrictive control system as defined in claim 10, wherein said control means controls said restrictive force generating means to cancel said restrictive force when said load sensing means detects a throttle opening of said engine throttle valve smaller than a predetermined positive value of throttle opening during a detection of said steering angle greater than a predetermined level of steering angle by said steering angle sensing means.

* * * * *